Patented Aug. 26, 1930

1,774,089

UNITED STATES PATENT OFFICE

WILFRID GIBSON AND JOSEPH BARON PAYMAN, OF BLACKLEY, MANCHESTER, ENGLAND, ASSIGNORS TO IMPERIAL CHEMICAL INDUSTRIES LIMITED, OF LONDON, ENGLAND

MANUFACTURE OF MONOALKYL ETHERS OF ETHYLENE GLYCOL

No Drawing. Application filed September 7, 1929, Serial No. 391,110, and in Great Britain September 27, 1928.

The monoalkyl ethers of ethylene glycol are usually manufactured by treatment of an alcohol with ethylene oxide under pressure.

We have now discovered that this reaction proceeds more smoothly, and greatly improved yields are obtained, in the presence of the normal sulphates of bi- and polyvalent metals, particularly zinc sulphate, nickel sulphate, or chromic sulphate.

Our invention is illustrated but not limited by the following examples, in which the parts are by weight.

*Example 1.*—To a solution of 82 parts ethylene oxide in 410 parts of methyl alcohol are added 2 parts of zinc sulphate. The whole is maintained at 100–105° C. in an autoclave until the reaction is complete. This is indicated when the pressure (initially about 90 lbs. per sq. in.) has fallen to about 50 lbs. and requires about 6 to 8 hours. The reaction product is distilled at ordinary pressure under an efficient fractionating column, and the yield of methyl glycol, boiling at 122° C. to 125° C., is about 102 parts. This corresponds to 72% of theory from ethylene oxide.

*Example 2.*—To a solution of 88 parts of ethylene oxide in 440 parts of ethyl alcohol are added 2 parts of nickel sulphate. The whole is maintained at approximately 100° C. until the pressure, initially about 80 lbs. per sq. in., has fallen to about 25 lbs. per sq. in. The reaction product is fractionally distilled at ordinary pressure, and about 126 parts of ethyl ether of ethylene glycol are obtained, corresponding to a yield of about 70% of theory from ethylene oxide.

In place of single metallic sulphates as employed in the above example mixtures of them may be used.

What we claim and desire to secure by Letters Patent is:—

1. The process for the manufacture of monoalkyl ethers of ethylene glycol which comprises the heating together of an alcohol with ethylene oxide in the presence of the normal sulphate of a metal having a valency of more than 1.

2. The process for the manufacture of monoalkyl ethers of ethylene glycol which comprises the heating together of an alcohol with ethylene oxide in the presence of the normal sulphate of a metal having a valency of two.

3. The process for the manufacture of monoalkyl ethers of ethylene glycol which comprises the heating together of an alcohol with ethylene oxide in the presence of the normal sulphate of nickel.

4. The process for the manufacture of monoalkyl ethers of ethylene glycol which comprises the heating together of an alcohol of the general formula $C_n H_{2n+1}.OH$ in which n is not greater than four with ethylene oxide in the presence of the normal sulphate of a metal having a valency of more than 1.

5. The process for the manufacture of monoalkyl ethers of ethylene glycol which comprises the heating together of an alcohol of the general formula $C_n H_{2n+1}.OH$ in which n is not greater than four with ethylene oxide in the presence of the normal sulphate of a metal having a valency of two.

6. The process for the manufacture of monoalkyl ethers of ethylene glycol which comprises the heating together of an alcohol of the general formula $C_n H_{2n+1}.OH$ in which n is not greater than four with ethylene oxide in the presence of nickel sulphate.

7. The process for the manufacture of the monoethyl ether of ethylene glycol which comprises the heating together of ethyl alcohol with ethylene oxide in the presence of nickel sulphate.

In testimony whereof we affix our signatures.

WILFRID GIBSON.
JOSEPH BARON PAYMAN.